United States Patent [19]

Rytter et al.

[11] Patent Number: 5,042,314

[45] Date of Patent: Aug. 27, 1991

[54] STEERING AND TRANSMISSION SHIFTING CONTROL MECHANISM

[75] Inventors: Noel J. Rytter, Peoria; Val G. Boucher, Roanoke; Craig B. Kelley, Dunlap, all of Ill.

[73] Assignee: Caterpillar Inc., Peoria, Ill.

[21] Appl. No.: 610,736

[22] Filed: Nov. 9, 1990

Related U.S. Application Data

[63] Continuation of Ser. No. 430,410, Nov. 2, 1989, abandoned.

[51] Int. Cl.⁵ .............................................. B60K 20/00
[52] U.S. Cl. ............................... 74/335; 74/471 XY; 74/523; 180/333; 180/336
[58] Field of Search .............. 74/335, 471 XY, 473 R, 74/523; 180/333, 334, 336

[56] References Cited

U.S. PATENT DOCUMENTS

| | | | |
|---|---|---|---|
| 3,142,227 | 7/1964 | Stringer | 89/136 |
| 3,811,336 | 5/1974 | Pulskamp | 74/471 XY |
| 3,867,600 | 2/1975 | Phillips | 200/157 |
| 3,937,294 | 2/1976 | Haddock | 74/523 |
| 3,940,674 | 2/1976 | Gill | 74/471 XY |
| 4,012,014 | 3/1977 | Marshall | 74/523 |
| 4,216,467 | 8/1980 | Colston | 74/471 XY |
| 4,380,938 | 4/1983 | Olson | 74/473 |
| 4,533,899 | 8/1985 | Isaksson | 74/471 XY |
| 4,541,497 | 9/1985 | Riediger et al. | 180/6.48 |
| 4,574,651 | 3/1986 | Nordstrom | 74/471 |
| 4,700,802 | 10/1987 | Fought | 180/324 |
| 4,798,099 | 1/1989 | Alexander et al. | 74/473 |
| 4,896,558 | 1/1990 | Meier et al. | 74/543 |

OTHER PUBLICATIONS

Exhibit A—Literature from RMH—Control AB, Stockholm, Sweden, Circa 1988/89

Exhibit B—Literature from Volvo BM (associated with VME Industries, Sweden AB) Circa 1988

Exhibit C—Annotated Literature on a Control Offered by Liebherr International AG, of Switzerland, or related subsidiary (Circa 1988/89)

Exhibit D—Photograph of a control handle offered by Engstrom Nilson Maskin AB of Sweden and/or Engson of Sweden (Circa 1988)

Exhibit E—Literature on a Liebherr-America, Inc. "Litronic" Excavator (Circa 1988/89)

Exhibit F—Literature from Cyber-Tech, Inc. of Portland, Oregon, on a Saw-Handle Control (Circa October, 1988)

Primary Examiner—Leslie A. Braun
Assistant Examiner—Scott Anchell
Attorney, Agent, or Firm—I Charles E. Lanchantin, Jr.; John W. Grant

[57] ABSTRACT

A vehicular steering and transmission shifting control mechanism includes a transversally rockable control handle and a steering actuator element connected at the bottom thereof to selectively depress either a left or right actuating plunger of a hydraulic pilot valve assembly for effecting steering. The control handle is contoured to be easily grasped and to position an electrical switch actuating element for comfortable movement by an operator's thumb to change the speed of a multi-speed transmission through an associated electronic transmission control system. A three-way electrical switch actuating element at the front of the control handle is adapted to be rocked to select one of forward, neutral, and reverse modes of the transmission.

13 Claims, 3 Drawing Sheets

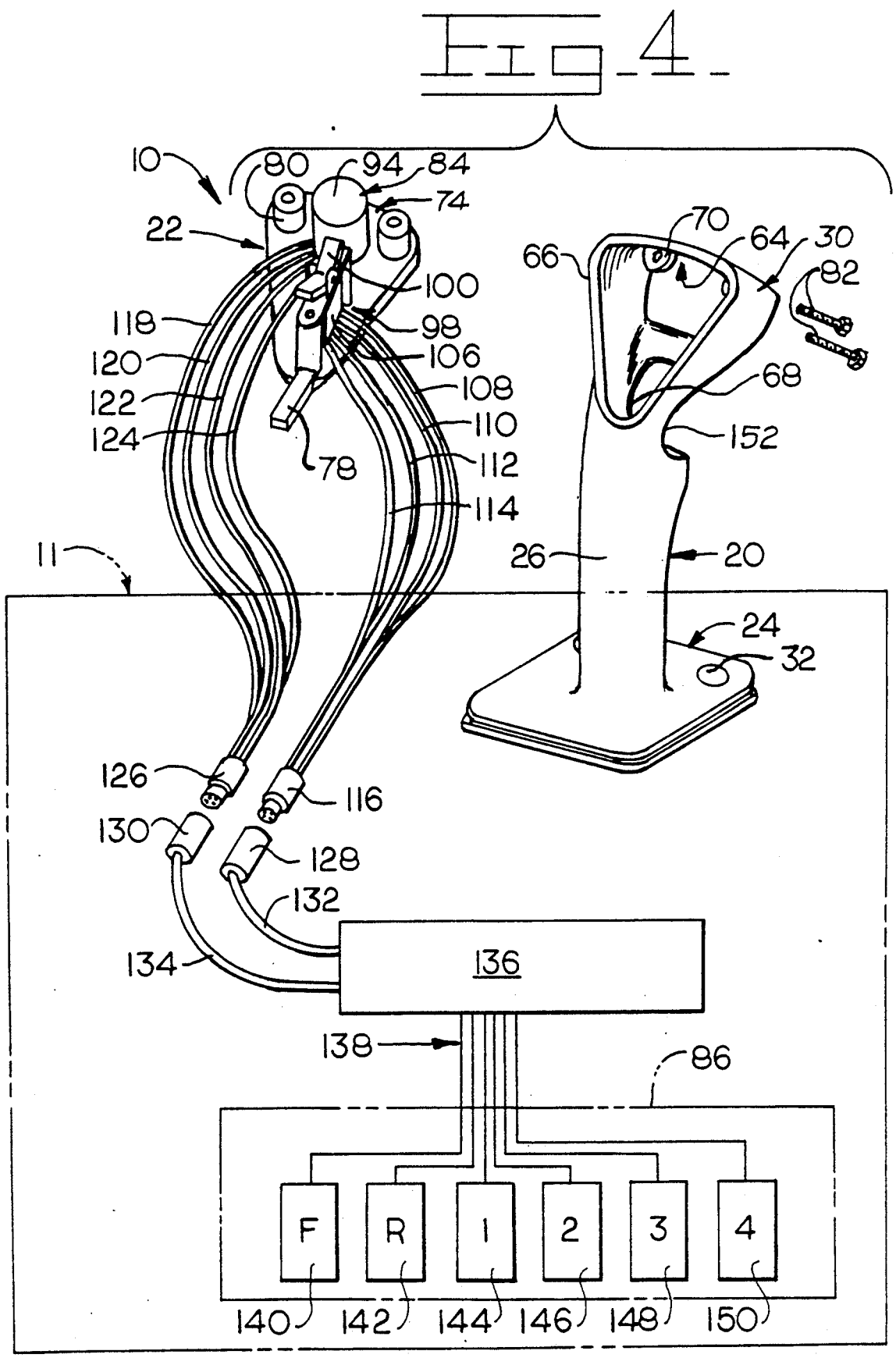

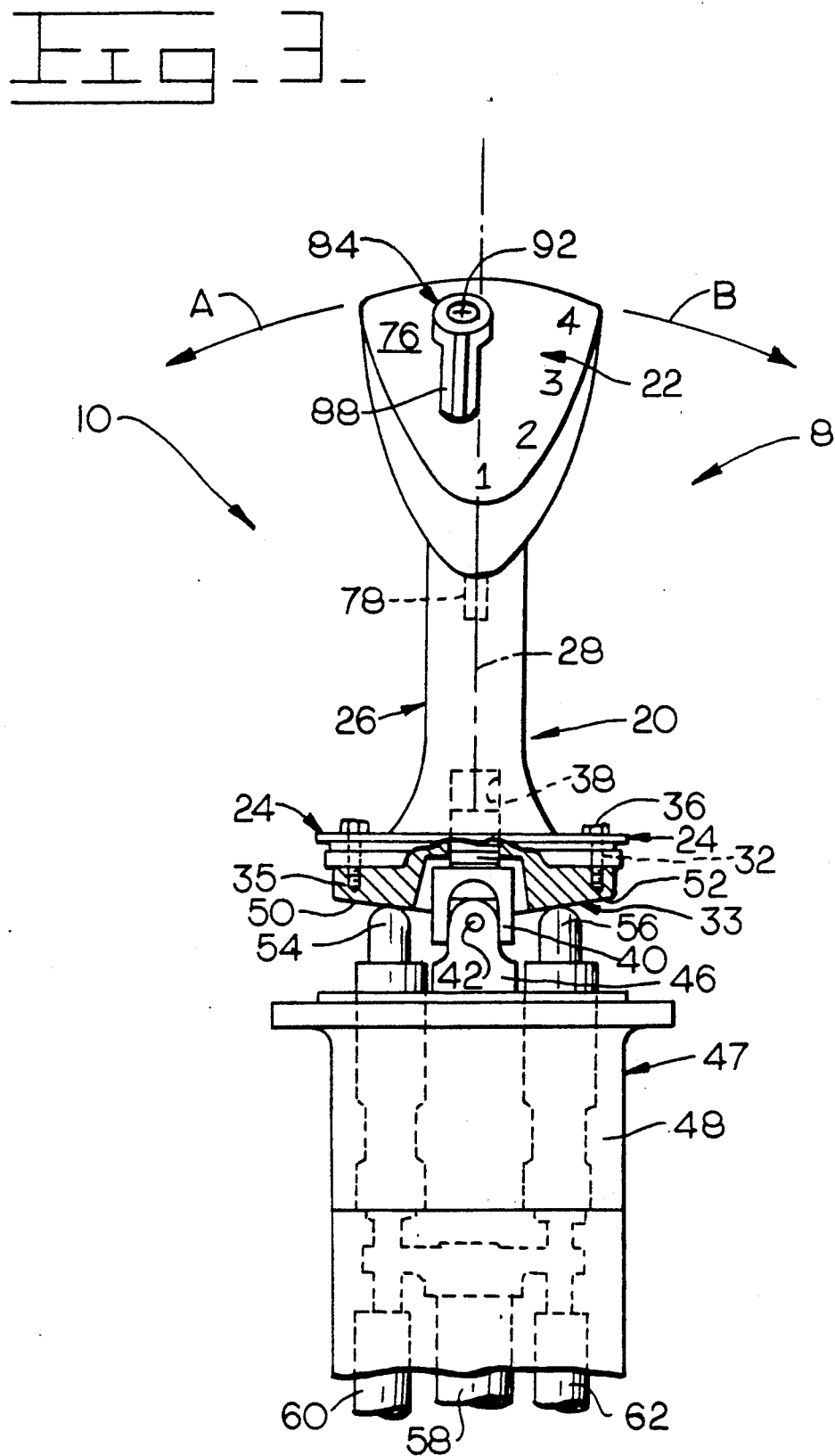

STEERING AND TRANSMISSION SHIFTING CONTROL MECHANISM

This is a continuation of Ser. No. 430,410, filed Nov. 2, 1989, now abandoned.

TECHNICAL FIELD

The present invention relates to a vehicle steering and transmission control mechanism, and more particularly to an easily grasped, upright steering control handle having a conveniently positioned actuator element thereon for selecting a transmission operating mode.

BACKGROUND ART

While the majority of earthmoving vehicles use a conventional steering wheel system, a few have incorporated a control mechanism using a substantially vertical control handle of the cylindrical joy-stick type for steering purposes. In such construction the control handle can be pivoted by an operator's left hand to effect a left turn when it is rocked to the left, and a right turn when it is rocked to the right in a substantially vertical and transversely oriented plane.

In one control mechanism offered by VME Industries Sweden AB, of Eskilstuna, Sweden, an actuator element located adjacent to the steering control handle can be switched between an active mode wherein the control handle can effect steering, and an inactive mode wherein a conventional steering wheel can effect steering and the control handle is disabled. In that mechanism a three-way rocker switch is located next to the steering control handle that can be manipulated to obtain forward and reverse movement of the vehicle, and another actuator element near the rocker switch can be depressed to force the transmission to shift down to first gear. Such a widely dispersed arrangement of the actuating elements makes it inconvenient for the operator. Not only is it fatiguing, but also the operator's reaction time is slower since his hand must travel from one actuating element to another.

One other control mechanism offered by Engstrom & Nilson Maskin AB of Jupitervagen 10, Sweden, incorporates a generally cylindrical, upright control handle that is rockable in a transverse plane to effect steering, and a three-way rocker switch located at the top thereof to effect forward and reverse operation of the vehicle. However, that placement of the rocker switch is relatively inconvenient, and there is no provision at the control handle for shifting the gear ratios of the associated transmission. That system uses a conventional steering wheel for high speed travel and simultaneous disabling of the control handle's steering capability.

In a further multi-purpose control offered by Liebherr International AG, of Bulle, Switzerland, or one of its subsidiaries, an upstanding control handle could be pivotally rocked in a transverse plane to the left or to the right in order to obtain the rack-back of a bucket or the dumping of the bucket, and could be pivotally rocked in a longitudinal plane to raise the lift arms or to lower the lift arms supporting the bucket. In addition, twisting of that control handle about its own vertical axis would cause a speed selection between the first, second, and third gear ratios of the transmission of the vehicle. Moreover, a three-way rocker switch on the front portion of the control handle and facing away from the operator could be manipulated to obtain forward and reverse travel of the vehicle. That servo-actuated joystick control is independent of the vehicle's steering control mechanism.

Historically, single lever control mechanisms have incorporated complex mechanical linkages with too many operating joints, or a plurality of cables to achieve the desired multiple operating functions.

Accordingly, what is desired is a simple, yet rugged and economical steering and transmission shifting control mechanism for operating a vehicle that will use an upright and rockable control handle for the steering function, and will incorporate a more convenient actuating element in close association with the control handle for effecting a speed change function of the associated multi-speed transmission. Preferably, another actuating element should also be closely associated with the control handle for effecting a directional change of that transmission. Furthermore, the control mechanism should be easy to assemble or service, and the various actuating elements should be so constructed and arranged relative to the control handle that the principles of economy of motion of an operator's hand are fully employed. In this way operator fatigue can be minimized because the displacement of the control handle and associated actuating elements is natural relative to the operating function achieved.

The present invention is directed to overcoming one or more of the problems as set forth above.

DISCLOSURE OF THE INVENTION

In one aspect of the present invention a steering and transmission shifting mechanism is provided that includes an upstanding control handle, a support for mounting the control handle for pivotal movement, and first actuator means for steering the vehicle with such pivotal movement. The control handle has a lower grip portion, an upper portion defining an upper surface generally facing an operator, and second actuator means is provided for changing the speed of the vehicle that includes an actuating element mounted on the control handle above the upper surface in a position that it can be conveniently moved by an operator's thumb to a plurality of speed positions.

In another aspect of the invention a steering and transmission shifting mechanism includes a control handle having a lower grip portion defining an upstanding axis, and an upper portion defining an inclined surface that faces upwardly and generally toward the operator. Also incorporated therewith are first means for mounting the control handle for pivotal movement in a transverse plane, second means for steering the vehicle with such pivotal movement of the control handle, and third means for changing the speed of the vehicle including an actuating element mounted on the control handle and extending above the inclined surface, and being movable by an operator's thumb for changing the speed.

More particularly, the instant shifting mechanism is rugged and dependable by not using any complex linkages or cables to obtain the control functions. And the control handle is contoured so that it can be grasped by either hand of an operator, and the actuating elements so arranged on the control handle that the operator's thumb can effect the speed changing function while one of the operator's fingers can effect the directional changing function.

BRIEF DESCRIPTION OF THE DRAWINGS

FIG. 3 is a rear elevational view of the control handle shown in FIGS. 1 and 2, and also showing a hydraulic pilot steering valve assembly associated therewith; and FIG. 4 is a view similar to FIG. 1, only showing an exploded view of the major portions of the control handle and the separable electric wiring harness leading to an electronic control system, and the relationship of the latter system to a plurality of clutch actuating solenoids of a multi-speed transmission.

BEST MODE FOR CARRYING OUT THE INVENTION

Figure 1:
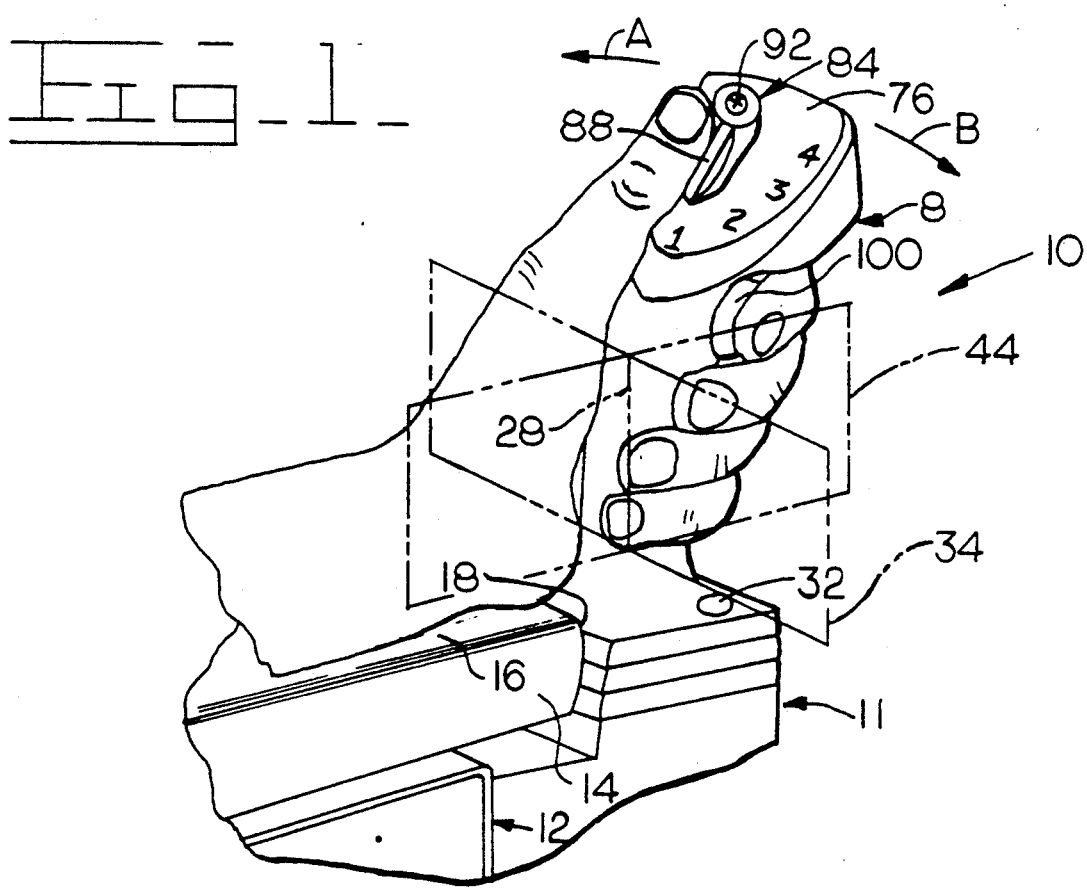
FIG. 1 is an oblique inside perspective view of an operator's left hand in grasping relation to the control handle of the steering and transmission shifting control mechanism of the present invention.
Figure 2:
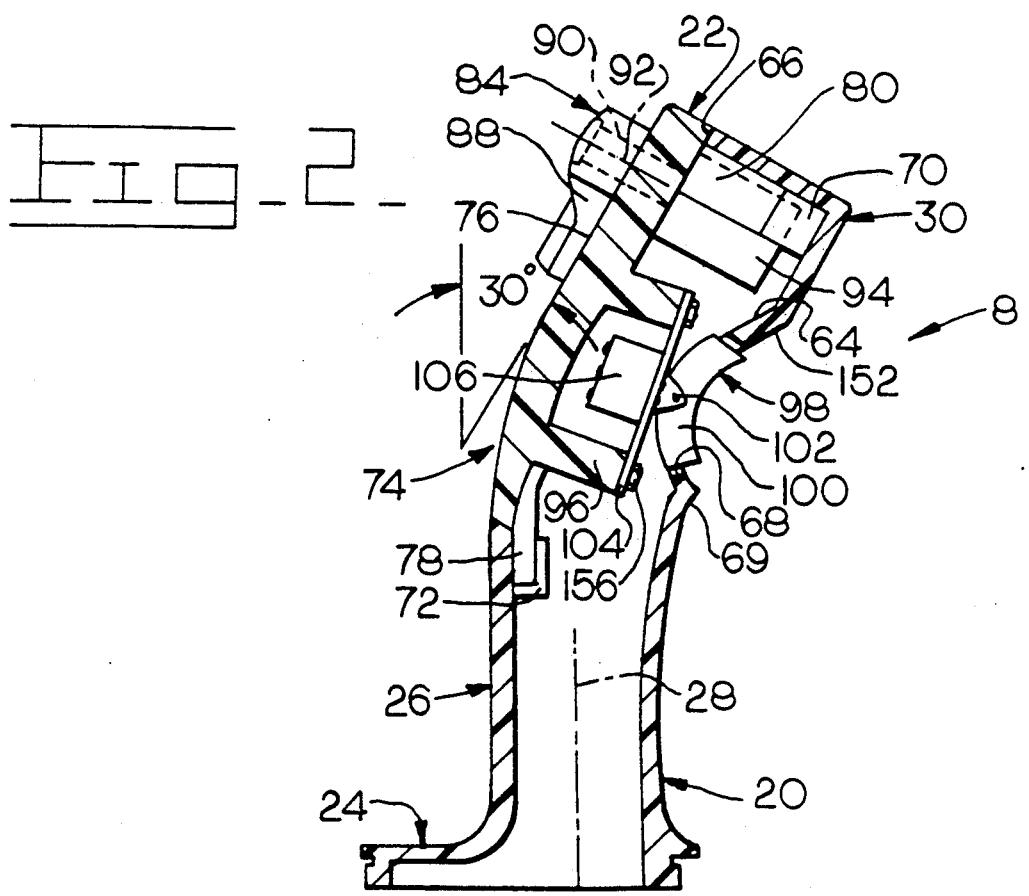
FIG. 2 is a right side elevational view of the control mechanism shown in FIG. 1, showing major portions thereof in cross section to illustrate additional details of construction.

Referring to FIGS. 1 and 2, a control handle 8 of a steering and transmission shifting control mechanism 10 for a vehicle 11 is shown immediately forwardly of an operator's seat 12 having a left arm rest 14. The left arm rest has an upper, generally horizontal surface 16 that terminates in a front face 18, and it is to be noted that the operator's palm edge is preferably conveniently supported by that upper surface adjacent his wrist. The contoured control handle 8 is located immediately forwardly of the front face 18, and in general longitudinal alignment therewith, so that the operator's fingers can easily grasp it.

As is shown in FIGS. 2 and 4, the control handle 8 has two major parts—namely an integrally formed hollow body 20 and a removable actuator assembly 22. The body defines a mounting base portion 24, a tubular grip portion 26 generally encircling an upright axis 28, and an upper portion 30.

The base portion 24 has a plurality of bores 32 therethrough, and as shown in FIGS. 1 and 3 the control mechanism 10 includes support means 33 for mounting the base portion of the control handle 8 for pivoting movement in an upright and generally transversely oriented plane 34 through the axis 28. Furthermore, the support means 33 includes a rockable steering actuator element 35, and the base portion is releasably secured thereto by fasteners or bolts 36 that are individually inserted through each of the bores 32 and screwthreadably received in the actuator element. In use, the actuator element 35 has a threaded bore 38 arranged on the axis 28, and an externally threaded depending yoke 40 is screwthreadably received in the bore 38 and supported for rocking movement in the transversely oriented plane 34 by a generally horizontal pivot pin 42 lying in an upright and longitudinal plane 44 through the axis 28. The pivot pin 42 is secured to an upstanding bracket 46 connected to the upper part of first actuator means 47 for steering the vehicle including a hydraulic pilot valve assembly 48.

The steering actuator element 35 further defines two generally planar, downwardly facing actuating surfaces 50 and 52 at the opposite sides of the pivot pin 42, and these surfaces respectively engage a left steer actuating plunger or pressure reducing valve spool 54 and a right steer actuating plunger or pressure reducing valve spool 56. Although not illustrated, the plungers are resiliently urged upwardly and into continual contact with these surfaces. A source of hydraulic fluid at a preselected pressure is available at an inlet line 58, and with depression of either plunger that source is communicated at a proportionately reduced value to a left outlet line 60 or a right outlet line 62 connected to the pilot valve assembly. The pilot valve assembly 48 can be of any well-known construction, such as that commercially offered by the Rexroth Corporation of Bethlehem, Pa. 18017-2131.

Referring now to FIGS. 2 and 4, the handle body 20 has an upwardly and rearwardly facing cavity 64, an upper peripheral edge surface 66 around the cavity, and a rectangular slot 68 through a front wall 69 of the upper portion 30 that communicates with the cavity. A plurality of mounting pedestals 70 are formed within the cavity 64, and a substantially vertically oriented, rear U-shaped slot 72 is formed within the center portion 26 in an intersecting relationship with the lower portion of the cavity's edge.

The actuator assembly 22 has a mounting deck 74 defining an inclined upper surface 76 that faces upwardly and generally toward the vehicle's operator, and which deck is sealingly engaged with the edge surface 66 surrounding the cavity 64. The mounting deck also has a locking tang 78 that depends generally vertically and into interlocking engagement with the U-shaped slot 72 of the center portion 2 of the body 20. A first plurality of internally threaded support members 80 extend inclinably downwardly from the supporting deck and are individually seated on one of the mounting pedestals 70, and a corresponding plurality of fasteners or bolts 82 extend upwardly through the pedestals to be screwthreadably received in the support members as shown in FIG. 4.

Advantageously, the removable actuator assembly 22 includes second actuator means 84 for changing the speed of a conventional, reversible, multi-speed transmission 86 powering the vehicle 11 as is diagrammatically illustrated in phantom box outline form in FIG. 4. The second actuator means 84 shown in FIG. 2 includes a pivotable actuating switch element 88 that is mounted above the mounting deck 74 on a rotatable shaft 90 having an upwardly and rearwardly inclined central axis 92. A generally cylindrical, rotary type electrical switch 94 is releasably secured to the sloping underside surface of the mounting deck, and in the embodiment illustrated conjoint rotation of the actuating element 88 and the shaft 90 between the 3 o'clock and 6 o'clock positions when viewing FIG. 3 is effective to select one of the transmission gear speed ratios identified by the indicia numbers 1,2,3 and 4 on the surface 76. The rotary electrical switch 94 has internal detents, not shown, to maintain such positions precisely as is known in the art.

As is shown in FIGS. 2 and 4, a second plurality of internally threaded support members 96 extend inclinably downwardly from the mounting deck 74, and third actuator means 98 are releasably secured thereto for changing the direction of longitudinal travel of the vehicle. Specifically, the third actuator means 98 includes a switch actuating element 100 mounted for three-way rocking movement on a pivot pin 102 secured to a mounting plate 104. An electric switch mechanism 106, also having internal detents to maintain the switch actuating element in one of the three positions, is secured to the opposite side of that mounting plate and has four electric lines 108, 110, 112 and 114 secured thereto that depend to a conventional quick-release connector 116 as is diagrammatically shown in FIG. 4. The rotary electric switch 94 shown in FIGS. 2 and 4 also has four electric lines 118, 120, 122 and 124 secured thereto as is diagrammatically indicated in FIG. 4 and which depend to a similar quick-release connector 126. The pair of connectors 116 and 126 mate with connectors 128 and 130 respectively, and the latter are respectively connected to wiring harnesses 132 and 134 leading to an electronic transmission control system or microprocessor 136. A plurality of solenoid actuating lead lines, identified generally by the reference number 138 lead from the microprocessor to two directional clutch actuating solenoids 140 and 142, and four speed clutch actuating solenoids 144, 146, 148 and 150 of the transmission 86.

Referring to FIGS. 1 and 2, and to the contoured shape of the control handle 8, it can be noted that the slot 68 is located in a recess 152 in the arcuately shaped front wall 69. The mounting plate 104 of the third actuator means 98 is releasably secured to the support members 96 by fasteners or bolts 156 extending through the mounting plate and screwthreadably received in the support members. In such location the switch actuating element 100 extends through the slot 68 and forwardly of the front wall 69 of the recess while generally conforming to the arcuate shape thereof.

INDUSTRIAL APPLICABILITY

In use, the fingers of the left hand of an operator can comfortably grasp the control handle 8 by generally surrounding the front wall 69 and the recess 152 of the body 20 as is clearly illustrated in FIG. 1. In that hand position the vehicle can be steered to the left when traveling forwardly by rocking the control handle 8 about the axis of the pivot pin 42 in the direction of the arrow A as is indicated in FIGS. 1 and 3. Such pivotal movement of the control handle and the steering actuator element 35 causes the surface 50 to depress the left steer actuating plunger 54, whereupon pressurized pilot fluid is supplied to the left outlet line 60 at a reduced value from that in the inlet line 58 in substantial proportion to the displacement of the plunger. On the other hand, movement of the operator's palm to the right in the direction of the arrow B will cause the downward displacement of the right steer actuating plunger 56 and a proportionate pressure signal in the right outlet line 62 to achieve a right turn of the vehicle.

Simultaneously, the operator can manually change the operating speed of the transmission 86 by generally moving his left thumb laterally. Normally the left thumb will rest comfortably on the inclined surface 76 or will be disposed in a somewhat lower elevational position of engagement with the right side of the body 20. In the illustrated position of the switch actuating element 88, rightward movement of the thumb will cause the actuating element to pivot about the axis 92 from the first gear ratio position to the second gear ratio position as is indicated by the reference indicia numbers 1 and 2 on the inclined surface. On a working vehicle such as a large earthmoving wheel loader it is contemplated that the actuating element 88 will be in these two lower operating positions approximately 80% of the time. Further rightward and counterclockwise travel of the actuating element by the operator's thumb will result in either the third gear ratio position or the fourth gear ratio position being established as is indicated by the indicia numbers 3 and 4, which conditions are associated with high ground speed travelling modes rather than the slower working modes.

In each of the four positions of the switch actuating element 88 the selected one of the four lead lines 118, 120, 122 and 124 is merely grounded to complete a relatively low amperage electrical circuit with respect to the electronic control system or microprocessor 136. Suitable circuitry in the control system, not shown, is then effective to supply actuating power at a larger amperage to the selected one of the transmission solenoids 144, 146, 148 and 150 for the desired speed or gear ratio.

At the same time, the operator's index or trigger finger can be urged rearwardly against the upper part of the three-way switch actuating element 100 to cause the forward lead line 108 of the electrical switch mechanism 106 to be grounded and to thereby cause a signal to be directed to the electronic system 136 as substantially mentioned above and to actuate the forward solenoid 140. Likewise, rearward movement of the trigger finger on the lower part of that three-way switch actuating element will cause the reverse lead line 112 to be grounded. This will cause an electric signal to be transmitted from the control system 136 to the reverse solenoid 142. When the index finger positions the switch actuating element 100 to an intermediate or centered position the lead line 110 is grounded to effect a neutral signal to the control system 136. This is effective to cut off any electrical signal to the directional solenoids 140 and 142 and, if desired, to disconnect one or more of the speed solenoids 144, 146, 148 and 150. The remaining lead line 114 attached to the electrical switch mechanism 106 is the common ground with the control system.

As is shown in FIG. 2, the inclined upper surface 76 of the actuator assembly 22 is preferably planar for a major portion thereof, is inclined approximately 30 degrees relative to the transverse plane 34, and is leaned away from the operator with upward extension thereof so that the thumb can rest in a natural position with respect thereto. Although not illustrated, it is contemplated that another switch actuating element requiring a straight line path of movement of the operator's thumb could be alternatively used for shifting the transmission speed, without departing from the spirit of the present invention. In such alternative instance, the rotary electrical switch 94 could be replaced by another commercially available switch of the positively detented, multi-position type.

It is further contemplated that the longitudinal plane 44 through the vertical axis 28 shown in FIG. 3 could be alternatively inclined to the right at the top, for example the axis of the control handle 8 could be rotated approximately 5 to 10 degrees, to provide additional operating comfort to the operator because the left hand has a natural relaxed orientation at such angle.

The hollow body 20 and the mounting deck 74 are preferably injection molded from a strong and wear resistant plastic material such as polycarbonate. In order to avoid any parting line joint, for example between the left and right halves of the hollow body, it is purposefully made as a single piece. This makes the control handle 8 very rugged, and makes the external surface of the body smooth for a more comfortable grip. Such comfort is enhanced by the generally elliptical cross section of the grip portion 26, wherein the long axis of the ellipse is longitudinal oriented.

In view of the foregoing description, it can be appreciated that the control mechanism 10 of the present invention is rugged in construction, yet simple and economical to manufacture. Moreover, an operator can easily grasp the control handle 8 and steer the vehicle 11 through lateral rocking movement of the control handle and the positive displacement of one of the plungers 54 and 56 of the hydraulic pilot valve assembly 48, while simultaneously moving his thumb laterally to displace the switch actuating element 88 and to select the desired speed rate of the transmission 86. Furthermore, the operator can quickly change the travel direction by the appropriate displacement of the switch actuating element 100 by rearward movement of the index finger, without taking his hand off the control handle, and while simultaneously operating other components on the vehicle such as an earthmoving loader bucket or the like.

Still another advantage of the present invention is that the actuator assembly 22 can be easily removed from the body after releasing only two fasteners 82, and this provides immediate access to the electrical members 94 and 106 for servicing purposes as they are immediately under the mounting deck 74 as can be visualized by reference to FIG. 4.

Other aspects, objects and advantages of this invention can be obtained from a study of the drawings, the disclosure and the appended claims.

What is claimed is:

1. A steering and transmission shifting control mechanism for operating a vehicle such as an earthmoving vehicle having a reversible multi-speed transmission for propelling the vehicle in forward and reverse directions at different speed ratios, comprising:
an upstanding control handle having a lower grip portion and an upper portion defining an upper surface generally facing an operator;
support means for mounting the control handle on the vehicle for pivotal movement by movement of an operator's hand;
first actuator means responsive to pivotal movement of the control handle for steering the vehicle; and
second actuator means for changing the speed ratio of the transmission of the vehicle including an actuating element mounted on the upper portion of the control handle and extending above the upper surface and being conveniently movable by an operator's thumb to a plurality of positions to effect the desired speed ratio change.

2. The control mechanism of claim 1 wherein the second actuator means includes an electric rotary switch, and the actuating element is pivotable abut a common axis with the rotary switch by movement of the operator's thumb to actuate the rotary switch.

3. The control mechanism of claim 2 including third actuator means for reversing the output of the transmission, the third actuator means including a three-way electrical switch mounted on the control handle and being movable by an operator's finger.

4. The control mechanism of claim 1 wherein the lower grip portion and upper portion of the control handle are hollow with the upper portion defining an upwardly facing cavity, an actuator assembly including said second actuator means releasably secured to the upper portion in a covering relationship to the cavity, and wherein the actuator assembly includes a mounting deck and an electric switch connected to the mounting deck and having a rotary shaft rotated by the actuating element.

5. The control mechanism of claim 4 wherein the actuator assembly includes another actuating element rockably mounted on the mounting deck, and a slot extending from the cavity through which the another actuating element extends.

6. The control mechanism of claim 5 including means for reversing the transmission in response to rocking movement of the another actuating element.

7. The control mechanism of claim 4 wherein the control handle includes means for interlockingly engaging the mounting deck with the upper portion, and means for releasably fastening the mounting deck to the upper portion.

8. A steering and transmission shifting control mechanism for operating an earthmoving vehicle having a reversible multi-speed transmission, comprising:
a control handle having a lower grip portion defining an upstanding axis, and an upper portion defining an inclined surface that faces upwardly and generally toward an operator;
first means for mounting the control handle on the vehicle for pivotal movement by sideways movement of an operator's hand;
second means responsive to pivotal movement of the control handle for steering the vehicle; and
third means for shifting the reversible multi-speed transmission of the vehicle through a plurality of gear ratio steps and including an actuating element mounted on the control handle and extending above the inclined surface and being movable by movement of an operator's thumb to a plurality of positions to effect the desired shifting of the transmission.

9. The control mechanism of claim 8 wherein the third means includes an electric rotary switch, and the actuating element is pivotable about a common axis with the rotary switch by movement of the operator's thumb to actuate the rotary switch.

10. The control mechanism of claim 9 including a three-way electrical switch mounted on the control handle and being movable by an operator's finger for reversing the transmission.

11. A steering and transmission shifting control mechanism for operating a vehicle such as an earthmoving vehicle including a reversible transmission having a plurality of discrete gear ratio steps, comprising:
a control handle having a lower grip portion defining a generally upstanding axis and an upper portion;
first means for mounting the control handle on the vehicle for pivotal movement in an upright plane passing through the axis of the lower grip portion;
second means responsive to lateral pivotal movement of the control handle for steering the vehicle; and
third means for changing the speed ratio of the transmission of the vehicle including an actuating assembly releasably mounted on the upper portion of the control handle and including an actuating element pivotably movable in response to movement of an operator's thumb to a plurality of discrete positions to effect the desired speed ratio change.

12. The control mechanism of claim 11 wherein the actuating assembly includes an electric switch mechanism having another actuating element pivotably rockable by an operator's finger to a plurality of discrete positions to effect one of forward, neutral and reverse modes of operation of the reversible transmission of the vehicle.

13. The control mechanism of claim 11 wherein the actuating assembly includes another actuating element pivotably rockable by an operator's finger to effect a directional change of the reversible transmission of the vehicle.

* * * * *